United States Patent
Harris et al.

(10) Patent No.: US 9,402,106 B1
(45) Date of Patent: Jul. 26, 2016

(54) SPLIT SIGNAL BANDS IN A MULTI-DIRECTIONAL REPEATER DEVICE

(75) Inventors: Robert W. Harris, Venice, FL (US); Paul D. Brooks, Weddington, NC (US); Thomas M. Gaebel, Lexington, SC (US)

(73) Assignee: Time Warner Cable Enterprises LLC, New York, NY (US)

( * ) Notice: Subject to any disclaimer, the term of this patent is extended or adjusted under 35 U.S.C. 154(b) by 1187 days.

(21) Appl. No.: 13/354,195

(22) Filed: Jan. 19, 2012

(51) Int. Cl.
*H04N 7/173* (2011.01)
*H04N 21/61* (2011.01)

(52) U.S. Cl.
CPC ....... *H04N 21/6118* (2013.01); *H04N 7/17309* (2013.01)

(58) Field of Classification Search
CPC ....................... H04N 21/6118; H04N 7/17309
See application file for complete search history.

(56) References Cited

U.S. PATENT DOCUMENTS

| | | | | |
|---|---|---|---|---|
| 5,864,748 | A * | 1/1999 | Dail | 725/126 |
| 2005/0057700 | A1* | 3/2005 | Lim et al. | 348/734 |
| 2005/0283815 | A1* | 12/2005 | Brooks | H04H 20/78 725/126 |
| 2008/0310838 | A1* | 12/2008 | Blauvelt | 398/43 |
| 2010/0146564 | A1* | 6/2010 | Halik et al. | 725/78 |
| 2011/0055875 | A1* | 3/2011 | Zussman | 725/65 |

* cited by examiner

*Primary Examiner* — Joshua Taylor
(74) *Attorney, Agent, or Firm* — Chapin IP Law, LLC

(57) ABSTRACT

According to one configuration, a repeater device includes a first port, a second port, and amplifier circuitry. The first port receives a first set of multiple signal bands transmitted in a downstream direction on a communication link. The second port receives a second set of multiple signal bands transmitted in an upstream direction on the communication link; the second set of multiple signal bands include a first signal band and a second signal band. The amplifier circuitry amplifies the first set of multiple signal bands and the second set of multiple signal bands. A given signal band in the first set resides in a frequency spectrum between the first signal band and the second signal band of the second set. Communications in the given signal band control at least one set-top box coupled to the communication link in the downstream direction.

22 Claims, 12 Drawing Sheets

SPLIT SIGNAL BANDS IN A MULTI-DIRECTIONAL REPEATER DEVICE

BACKGROUND

Traditional cable networks initially provided one-way broadcasting of televisions programs to subscribers. This was sufficient in the early days of television. Eventually, however, because the Internet has become so popular, subscribers now desire the ability to transmit as well as receive data over their network connections.

To accommodate subscribers' needs, conventional cable networks have been modified to enable subscribers to transmit more and more data in a reverse or upstream direction to a network. For example, via a device such as a cable modem, in addition to receiving data such content for playback, a subscriber is now able to transmit data over coaxial cable to remote locations over a network.

Modification of traditional cable systems to provide bi-directional data transmission capability has not been without problems. For example, a coaxial cable is one type of medium that used to today to convey signals to and from a respective subscriber's home. Typically, coaxial cable networks have a limited, usable bandwidth of about 1 GHz. Certain conventional cable systems allocate use of the 5-40 MHz band for upstream or inbound communications from a subscriber's home to the network. A balance of more than 900 MHz at an upper end of the frequency spectrum has been allocated for use in the downstream direction to transmit data to subscribers.

The allocation of limited bandwidth (e.g., 5-40 MHz to transmit data in the upstream direction) is becoming more undesirable because the amount of upstream traffic has increased substantially over the past years.

As a possible solution to addressing the increased demand to transmit in the upstream direction, it has been proposed to split the spectrum into multiple bands in which both a band at the lowest end of the available range and a band at the highest end of the available range are used to transmit data in the upstream direction. A middle band between the two higher and lower bands can be configured to provide downstream transmission of data.

Allocation of bandwidth in the upstream and downstream direction impacts the design of repeater devices that are used to amplify the signal along the cable. For example, it is not uncommon that a communication link is more than several hundred yards or even miles long. The cable may provide access to many customers. Hence, there may be substantial attenuation of signals due to long cable lengths and so-called splitting losses.

To account for losses in the cable and splitting devices, cable networks typically include so-called repeaters to provide signal amplification when needed. In general, a repeater is an electronic device that receives a signal and retransmits the signal at a higher level and/or higher power so that the signal can be transmitted longer distances over a respective communication link.

BRIEF DESCRIPTION OF EMBODIMENTS

Conventional cable systems suffer from a number of deficiencies. For example, as mentioned, the range of available bandwidth associated with a coaxial cable can be split into two bands—the lower band (e.g., a range such as between 5-40 MHz) can support upstream communications; the remaining higher band in the frequency spectrum can support upstream communications. These allocations are undesirable because there is insufficient bandwidth available in the upstream direction to transmit data. If the lower band is substantially widened (e.g., from 5-40 MHz to a range such as between 5-200 MHz) to provide additional bandwidth in the upstream direction, it would not be possible to control respective legacy set-top box devices in the downstream direction since a forward data channel is needed within this range.

Additionally, in the latter example as mentioned above, allocating a higher end top split portion of an available spectrum to transmit in the reverse direction is undesirable because losses are substantially greater at higher frequencies.

Embodiments herein deviate with respect to conventional techniques. For example, embodiments herein are directed to novel use of available bandwidth in a communication link conveying multi-directional communications to and from devices such as set-top boxes and servers.

More specifically, embodiments herein include a repeater device for disposing in a network environment. The repeater device includes a first port, a second port, and respective circuitry. The first port of the repeater device receives a first set of multiple signal bands transmitted in a downstream direction on a communication link in the network environment. The second port of the repeater receives a second set of multiple signal bands transmitted in an upstream direction on the communication link. During operation, the circuitry in the repeater device amplifies the received first set of multiple signal bands in the downstream direction and amplifies the received second set of multiple signal bands in the upstream direction.

By further way of a non-limiting example, the network environment in which the repeater device resides can further include a communication device (e.g., a set-top box) coupled to the communication link in the downstream direction with respect to the repeater device. Assume in this example that the first set of signal bands in the downstream direction includes a first signal band and a second signal band. Also, assume in this example that the second set of signal bands in the upstream direction includes a third signal band and a fourth signal band.

The first signal band (e.g., downstream band) in the first set of signal bands can reside in a frequency spectrum between the third and fourth signal bands (e.g., upstream bands) in the second set. The second signal band can reside outside both the first and second signal band. In one embodiment, communications transmitted in the selected downstream signal band (i.e., a downstream signal band sandwiched between two upstream signal bands) controls and/or provides data to at least one set-top box coupled to the communication link in the downstream.

The communication device can include tuner circuitry to receive data and control information transmitted via a repeater device in the downstream direction of the communication link. The tuner circuitry can support tuning via a so-called forward data channel located in a pre-defined carrier frequency range. In other words, in accordance with one embodiment, the communication device can tune to a downstream communications carrier on the communication link from the repeater in the pre-defined or allocated carrier frequency range.

By way of the non-limiting example as discussed above, at least a portion of the first signal band (e.g., one or more forward data channels) transmitted in the downstream direction can reside in the pre-defined downstream carrier frequency range (e.g., set-top box forward data carrier (FDC) tuner range) and at least a portion of the fourth signal band transmitted in the upstream direction on the communication link can reside within the pre-defined reverse data carrier (RDC) frequency range. Typically, the RDC set top box transmitter tuning range covers the sub-low upstream band, 5 to 40 MHz. Certain older set top boxes are more restricted, and can transmit only between 5 and 12 MHz on the RDC.

Note that set top boxes can include a separate tuner circuit for receiving the FDC (Forward Data Channel). A second, and sometimes third tuner circuit in a set-top box, can independently tune analog and QAM video carriers at the same time. Tuner circuits may be located on separate IC chips, or combined in one chip. Typically, the "pre-defined" FDC forward receiver tuning range is 54-130 MHz.

The circuitry in the repeater device as discussed herein can include filters, amplifiers, etc. In one embodiment, a first portion of the amplifier circuitry in the repeater device amplifies the first set of multiple signal bands and outputs the amplified first set of multiple signal bands on the second port in the downstream direction on the communication link. A second portion of the amplifier circuitry receives and amplifies the second set of multiple signal bands and outputs the amplified second set of multiple signal bands on the first port in an upstream direction on the communication link to a resource such as a headend, server, etc.

Each of the one or more communication devices coupled to the communication link in the downstream direction can be a set-top box operated by a respective subscriber. The set-top box can receive content transmitted over the communication link and play it back on a respective playback device based at least in part on data and/or control signals received in an FDC tuner signal band (e.g., pre-defined carrier frequency range). The control signals can include information indicating a frequency in which to tune and receive subsequent content, security information, descrambling information, etc.

In one embodiment, the communication link including one or more repeater devices along its length can be a coaxial cable conveying data in both the upstream direction and the downstream direction. In one non-limiting example embodiment, the tuner signal band includes communications transmitted downstream from the repeater device on a forward data channel or carrier frequency in a range between 82 and 88 Megahertz. The different directional signal bands can be spaced with a respective crossover band to accommodate filter roll-off. The crossover band generally can be made as narrow (spectrally efficient) as possible for the desired combination of low loss, high isolation, and minimum group delay.

Embodiments herein further include a method of receiving, on a first port of a repeater device, a first set of multiple signal bands transmitted in a downstream direction on a communication link; receiving, on a second port of the repeater device, a second set of multiple signal bands transmitted in an upstream direction on the communication link, the second set of multiple signal bands including a first signal band and a second signal band; and amplifying the first set of multiple signal bands and the second set of multiple signal bands, a given signal band in the first set residing in a frequency spectrum between the first signal band and the second signal band of the second set. As previously discussed, the communications in the given signal band of the first set controlling and/or providing data to at least one set-top box coupled to the communication link in the downstream direction.

These and other more specific embodiments are disclosed in more detail below.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for use in the field of distributing data in a network environment using one or more repeater devices. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details, summary, and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to one configuration, as briefly discussed above, a repeater device includes a first port, a second port, and amplifier circuitry. The repeater device resides in-line with respect to a communication link such as a coaxial cable disposed between resources such as a data distribution resource and one or more subscribers in a cable network. The first port of the repeater device receives a first set of multiple signal bands transmitted in a downstream direction on a communication link from the data distribution resource. The second port of the repeater device receives a second set of multiple signal bands transmitted in an upstream direction on the communication link from the one or more subscribers; the second set of multiple signal bands include a first signal band and a second signal band. The amplifier circuitry amplifies the first set of multiple signal bands and the second set of multiple signal bands. A given signal band in the first set resides in a frequency spectrum between the signal bands of the second set.

In one embodiment, the frequency spectrum of a coaxial cable as discussed herein can include four distinct signal bands, neighboring signal bands in the spectrum support transmission of data in opposite directions. Communications in a given signal band (e.g., a band encompassing at least a portion of the tuning range of the forward data channel) of the allocated frequency spectrum in the downstream direction control and/or provide data to at least one communication device such as a set-top box coupled to the communication link in the downstream direction.

Figure 1:
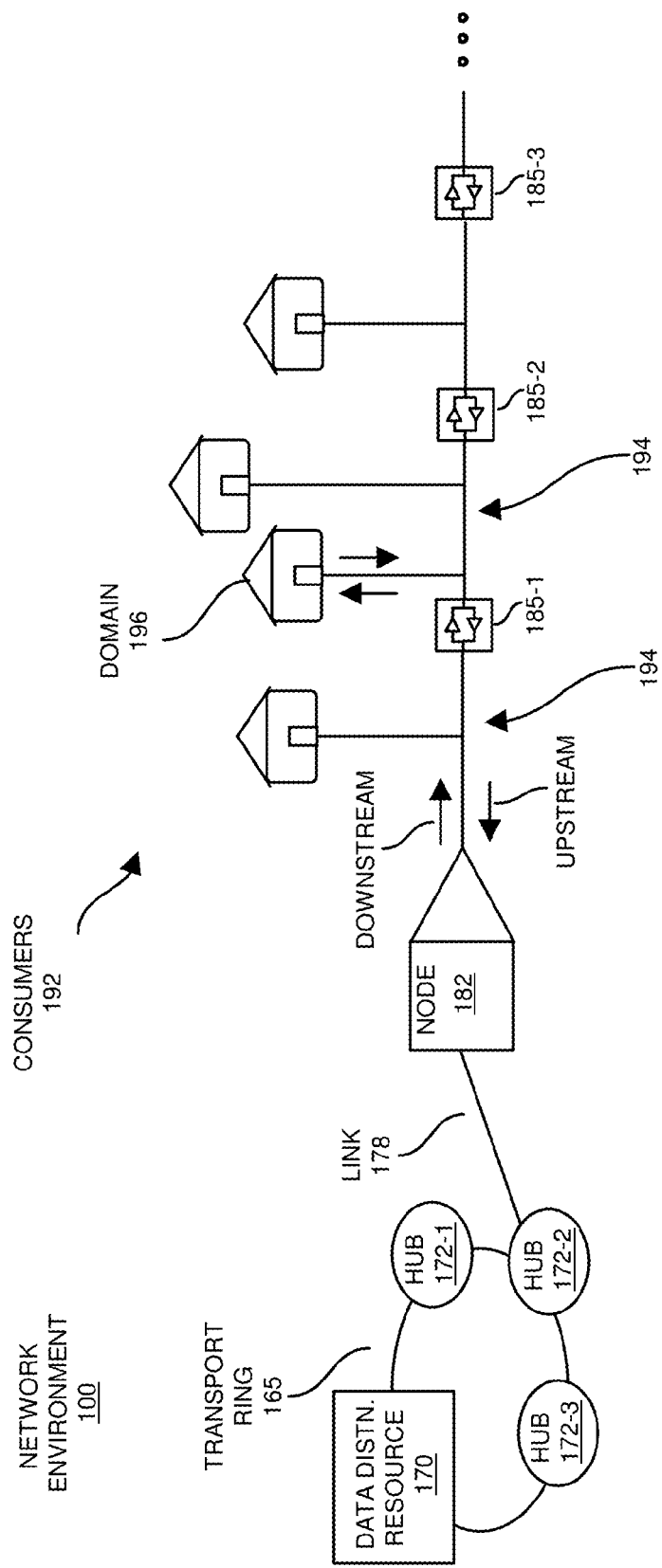
FIG. 1 is a diagram illustrating an example network environment including one or more repeater devices according to embodiments herein.

More specifically, FIG. 1 is an example diagram of a communication system for distributing data and providing network access according to embodiments herein.

As shown, the network environment 100 can include a data distribution resource 170 such as one or more servers or headend that facilitates reception and transmission of data over transport ring 165 to hubs 172 (e.g., hub 172-1, hub 172-2, hub 172-3, ... ).

In this example, communication link 178 provides connectivity between hub 172-2 and node 182. Communication link 178 can be any type of link such an optical link, wire link, etc.

Node 182 receives the data transmitted over communication link 178 and forwards the data to consumers 192 through at least a portion of the network infrastructure 194.

Network infrastructure 194 can include resources such as communication links, amplifiers, repeaters, power supplies, etc., facilitating conveyance distribution of data to and from consumers 192. For example, network infrastructure 194 can include one or more repeater devices 185 (e.g., repeater device 185-1, repeater device 185-2, repeater device 185-3, etc.). The repeater devices 185 can be configured to amplify signals transmitted in both the upstream and direction.

By way of a non-limiting example and as previously discussed, the node 182 can receive data originating from data distribution resource 170 or other resource in the upstream direction. The node 182 transmits the data in a downstream direction to repeater device 185-1. The signals transmitted in the downstream direction by node 182 may become attenuated due traveling a long distance on a communication link of network infrastructure 194. The repeater device 185-1 receives and amplifies the signals in the downstream direction to different user domains including domain 196.

In addition to receiving data transmitted in a downstream direction, the subscriber in domain 196 can transmit data in the upstream direction on network infrastructure 194 back to node 182. In such an instance, the repeater device 185-1 receives the upstream transmitted data from domain 196 and/or upstream transmitted data from other nodes to node 182. Node 182 forward the data received from repeater device 185-1 to the appropriate resource such as data distribution resource 170.

Figure 2:
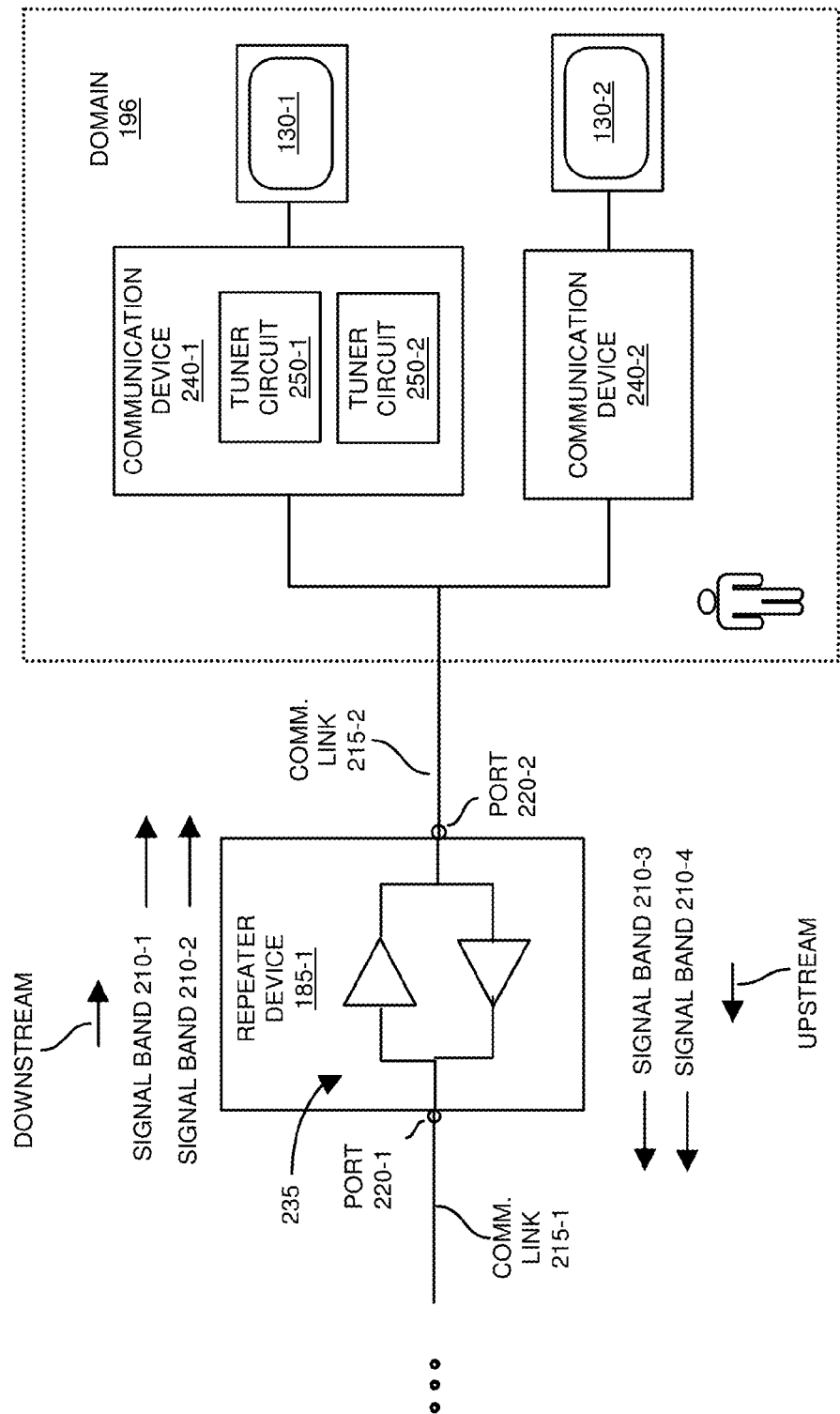
FIG. 2 is a diagram illustrating an example repeater device and downstream resources according to embodiments herein.

FIG. 2 is an example diagram illustrating a repeater device according to embodiments herein.

As previously discussed, network environment 100 includes one or more repeater devices 185. Each of the repeater devices can support substantially similar functionality.

In this example, the repeater device 185-1 includes a first port 220-1, a second port 220-2, and respective circuitry 235. Circuitry 235 can include one or more amplifiers, filters, signal splitters, etc.

In accordance with one embodiment, the first port 220-1 of the repeater device 185-1 receives a first set of multiple signal bands 210 (e.g., two or more signal bands such as signal band 210-1, signal band 210-2, etc.) transmitted in a downstream direction on communication link 215 of network infrastructure 194. Communication link 215 can be any suitable type of communication medium such as a coaxial cable, fiber link, etc.

A first portion of communication link 215-1 provides connectivity between the repeater device 185-1 and node 182 in an upstream direction with respect to repeater device 185-1. A second portion of communication link 215-2 provides connectivity between the repeater device 185-1 and one or more other resources such as a domain 196, repeater device 185-2, etc. in a downstream direction with respect to repeater device 185-1.

The second port 220-2 of the repeater device 185-1 receives a second set of multiple signal bands 210 (e.g., two or more signal bands such as signal band 210-3, signal band 210-4, etc.) transmitted in an upstream direction on the communication link 215.

In one embodiment, in addition to receiving data transmitted in the downstream direction, the one or more resources in domain 196 transmit signals in the upstream direction on the communication link 215 from node 182 one or more destination nodes. That is, in a forward direction, the signals transmitted downstream on the communication link 215 from node 182 one or more consumer destination nodes. In a reverse direction, communication link 115 conveys signals transmitted upstream from consumers 192 to node 182.

As mentioned, the signal bands 210 may be attenuated due to losses in the communication link 115 that can occur over long cable distances. During operation, the circuitry 235 in the repeater device 185-1 amplifies the received first set of multiple signal bands 210-1 and 210-2 and transmits the amplified signal bands 210-1 and 210-2 in the downstream direction on communication link 215-1 to domain 196 and/or other resources. In a reverse direction, the circuitry 235 in the repeater device 185-1 amplifies the received second set of multiple signal bands 230-3 and 230-4 and transmits the amplified signal bands 210-3 and 210-4 in the upstream direction on communication link 215-1 to a resource such as node 182.

In one embodiment, the domain 196 represents a respective subscriber's home environment. The domain 196 can include one or more communication devices 240-1, communication device 240-2, etc., operated by the respective subscriber.

Communication link 215 is a shared amongst multiple resources. For example, the different subscribers in network environment 100 receive different content transmitted in the downstream direction. The subscribers can share use of reverse channels in the upstream direction.

By way of a non-limiting example, the communication device 240-1 can be a set-top box device for receiving signals that are played back on display screen 130-1. Communication device 240-1 can include one or more tuner circuits such as tuner circuit 250-1 and tuner circuit 250-2.

In one embodiment, the tuner circuit 250-1 receives control and/or data signals while the tuner circuit 250-2 simultaneously receives video signals. As its name suggests, the tuner circuits 250 can be tuned to receive information (e.g., control, data, video, etc.) transmitted in the downstream direction from one or more other resources in network environment 100 such as from data distribution resource 170. Via communications in the downstream direction to the communication device 240-1, the remote resource (e.g., data distribution resource 170) sending data on a respective forward data channel (e.g., any portion of signal band 210-1) can control or, more specifically, tune the communication device 240-1 for playback of content. In one embodiment, the data distribution resource 170 or other resource can send appropriate information such as bandwidth allocation information on an out-of-band forward data channel so that the respective communication device 240-1 such as set-top box has sufficient information and authorization to tune to a channel containing streaming video content and display that content on a display screen.

As an example, the communication device 240-1 can be configured to playback content received on the signal band 210-2 (on playback device 130-1) in accordance with the control information received on the signal band 210-1.

As its name suggests, in one embodiment, the tuner circuitry 250 in the communication device 240-1 supports tuning of the communication device 240-1. Communications directed to the communication device 240-1 can be transmitted in the downstream direction in a pre-defined carrier frequency range dedicated to communicate with the tuner circuitry 250. In other words, in accordance with one embodiment, the communication device 240-1 (and one or more other set-top boxes in network environment 100) receives information on the forward data channel. In one embodiment, the FDC is the downstream portion of a bi-directional messaging and data distribution link, and is used to support functions such as VoD (Video on Demand) and SDV Switched Digital Video) messages, receiving program guide data, etc.

In one embodiment, the communication device 240-1 (e.g., set-top box) makes selections and executes tuning decisions locally based on locally stored guide data (e.g., DRAM populated via the FDC and other carriers such as the BFS) or protocol confirmations containing tuning location data (SDV).

Each of the one or more communication devices coupled to the communication link 215 in the downstream direction at the different subscriber domains can be a set-top box or other device operated by a respective subscriber. Each of such devices can be locally tuned based on cached data delivered over the FDC, via a respective tuner circuit residing the in the respective communication device. Thus, a forward data channel (e.g., any portion of signal band 210-1) can be used to provide tuning data to multiple set-top boxes coupled to the communication link 215.

In accordance with another embodiment, a portion of the second signal band 210-1 may be used as a forward data channel in which to control one or more settings of and/or provide data to the downstream communication devices.

In certain embodiments, either or both of communication device 240-1 (e.g., a set-top box) and communication device 240-2 (e.g., a cable modem device coupled to a computer) may support transmission of communications in an upstream direction on communication link 215-2 to repeater device 185-1. As previously discussed, the repeater device 185-1 receives communications on one or more of signal bands 210-3 and 210-4 and retransmits the amplified communication signals in an upstream direction on communication link 215-1.

Figure 3:
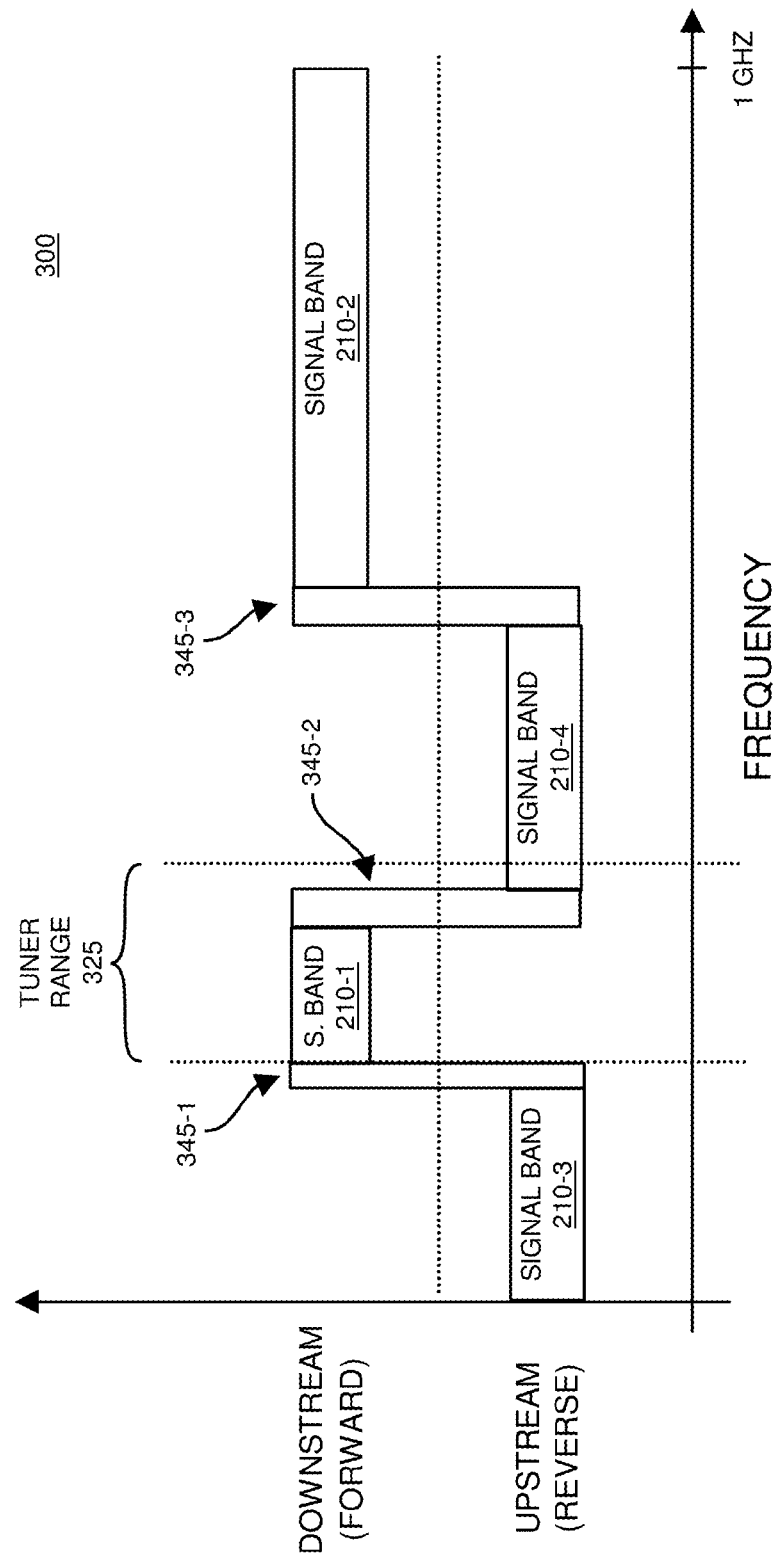
FIG. 3 is an example graph illustrating use of a frequency spectrum as well as transmission of signal bands in upstream and downstream directions according to embodiments herein.

FIG. 3 is an example diagram illustrating a possible allocation of signal bands in a frequency spectrum according to embodiments herein.

As shown, and by way of a non-limiting example, the RF frequency spectrum of communication link 215 (e.g., a coax cable) in graph 300 can be broken down to include one or more additional signal bands compared to conventional system as discussed above. For example, as previously discussed, the spectrum for conveying communications on the communication link 215 can be broken down to include two or more signal bands in the downstream and two or more signal bands in the upstream direction.

In this example, the frequency spectrum has been divided to support conveyance of signal band 210-1 and signal band 210-2 in the downstream direction as well as support conveyance of signal band 210-3 and signal band 210-4 in the upstream direction.

As discussed herein, the first signal band 210-1 (e.g., a downstream signal band) can reside in a frequency spectrum between the third signal band 210-3 (e.g., an upstream signal band) and the fourth signal band 210-4 (e.g., another upstream signal band). As previously discussed, communications transmitted in the first signal band 210-1 in the downstream direction can be used to control and/or provide data to one or more communication devices such as set-top boxes coupled to the communication link 215.

Also, as previously discussed, the tuner circuitry 250 in a respective communication device can be configured to receive tuner communications in a dedicated tuner range 325. The manufacturer of the communication devices sets the tuner circuit to operate within the tuner range 325. At least a portion of signal band 210-1 can be allocated to reside within the tuner signal band 325 (e.g., pre-defined carrier frequency range).

Note that the signal band 210-1 can be shifted (left or right), widened or narrowed, with respect to the placement of the signal band 210-1 as shown in graph 300. Thus, a lower frequency portion of signal band 210-1 may reside below the tuner range 325; a higher frequency portion of the signal band 210-1 may reside above the tuner range 325; all of the signal band 210-1 may reside within the tuner range 325; and so on.

By way of a non-limiting example, a portion of signal band 210-3 may reside in the tuner signal band range 325; a portion of the signal band 210-4 may reside within the tuner signal band 325; and so on.

Allocating at least a portion of the signal band 210-1 to be within the tuner range 325 of the frequency spectrum (to support downstream communications such as to a tuner circuit) enables a resource located upstream to transmit communications on a forward data channel downstream to one or more communication devices that are located and coupled to the communication link 215.

Further as shown in this example embodiment, the signal band 210-3 can be assigned to reside lower in the frequency spectrum than the first signal band 210-1; the signal band 210-1 can be assigned to reside lower in the frequency spectrum than signal band 210-4; the signal band 210-4 can be assigned to reside lower in the frequency spectrum than signal band 210-2. In other words, each signal band of the four signal bands 210 can be allocated to support communications in an opposite direction with respect to the neighboring signal band. For example, signal band 210-3 supports communications in an opposite direction than signal band 210-1; signal band 210-1 supports communications in an opposite direction than signal band 210-4; signal band 210-4 supports communications in an opposite direction than signal band 210-2; and so on.

Each pair of neighboring signal bands can be spaced with a crossover band. For example, in one embodiment, a first crossover band 345-1 resides in the frequency spectrum between the signal band 210-1 and the signal band 210-3; a second crossover band 345-2 resides in the frequency spectrum between the signal band 210-1 and the signal band 210-4; a third crossover band 345-3 resides between the signal band 210-4 and the signal band 210-2.

By way of further non-limiting example, note that at least a portion of the first signal band 210-1 transmitted in the downstream direction can reside in the pre-defined carrier frequency range or tuner range 325 and at least a portion of the fourth signal band transmitted in the upstream direction on the communication link 215 can reside within the tuner range 325. Accordingly, a portion of the pre-defined frequency range (i.e., tuner range 325) can be used to support both upstream and downstream types of communications.

As previously discussed, the repeater devices 185 receives signal bands 210-1 and 210-2 transmitted in the downstream direction and retransmits the signals at a higher level and/or higher power so that the signal bands can be further transmitted in a downstream direction over the communication link 115 to one or more repeaters and/or terminal devices. In a reverse direction, the repeater devices 185 receive signal bands 210-3 and 210-4 transmitted in the upstream direction and retransmit the signals at a higher level and/or higher power so that the signal bands can be further transmitted in the upstream direction over the communication link 215 to one or more destination nodes.

In one embodiment, control and program data are forwarded from the data distribution resource 170 such as a headend to the set-top boxes over a forward data channel (e.g., in signal band 210-1), which can be transmitted over any one of the frequencies 70-130 MHz. As mentioned, set-top boxes coupled to communication link 215 are configurable and can be set to receive within this tuner range.

In one example embodiment, the signal band 210-1 includes communications transmitted downstream from the repeater device on a carrier frequency or channel located in a range between 82 and 88 Megahertz. In such an instance, this signal band 210-1 is just below the FM frequency range to avoid possible interference.

As previously discussed, note that the signal bands 210 can be assigned any suitable range. In one embodiment, the signal band 210-3 can be assigned to include any or a portion of the range between 40 and 65 Megahertz. The signal band 210-3 supports one or more communications in the upstream direction of communication link 215. The signal band 210-3 can support one or more communications on a carrier frequency in a range between 5 and 65 Megahertz.

The signal band 210-1 can be assigned to include any or a portion of the range between 70 and 130 Megahertz. The signal band 210-1 supports one or more communications in the downstream direction of communication link 215.

In this example, the signal band 210-4 includes a range of carrier frequencies between crossover band 345-2 and crossover band 345-3 such as between 108 and 270 MHz. The signal band 210-4 supports one or more communications in the upstream direction of communication link 215.

The signal band 210-2 can be assigned to include any or a portion of the range above crossover band 345-3 such as the range between 330 and 1002 Mhz. The signal band 210-1 supports one or more communications in the downstream direction of communication link 215.

In accordance with the above allocation of signal bands, the combination of the signal band 210-3 and the signal band 210-4 include more than 150 Megahertz of available bandwidth to transmit data in the upstream direction. The combination of the signal band 210-1 and the signal band 210-2 include more than 500 or 600 Megahertz of available bandwidth to transmit data in the downstream direction in this example embodiment.

In accordance with another embodiment, the signal band 210-3 includes frequencies in a range between 5 and 40 MHz; the signal band 210-1 includes frequencies in a range between 55 and 190 MHz; the signal band 210-4 includes frequencies in a range between 230 and 350 MHz; and the signal band 210-2 includes frequencies in a range between 420 and 1000 MHz.

As previously discussed, the communication link 215 can be a coaxial cable supporting bi-directional communications at different carrier frequencies. In such an embodiment, the first port 220-1 of the repeater device 185-1 can be configured as a coaxial cable port on which to receive the first signal band 210-1 and the second signal band 210-2. The first port 220-1 transmits the amplified third signal band 210-3 and amplified fourth signal band 210-4 in the upstream direction. The second port also can be a coaxial cable port on which to receive the third signal band 210-3 and the fourth signal band 210-4. The second port 220-2 transmits the amplified first signal band 210-1 and amplified second signal band 210-2 in the downstream direction. Thus, the exit port for one direction is the same physical port as the entrance port for the opposite direction. That is, port 220-1 (e.g., both an input and output port) receives signal bands 210-1 and 210-2 and outputs amplified signal bands 210-3 and 210-4. Port 220-2 (e.g., both an input and output port) receives signal bands 210-3 and 210-4 and outputs amplified signal bands 210-1 and 210-2.

Figure 4:
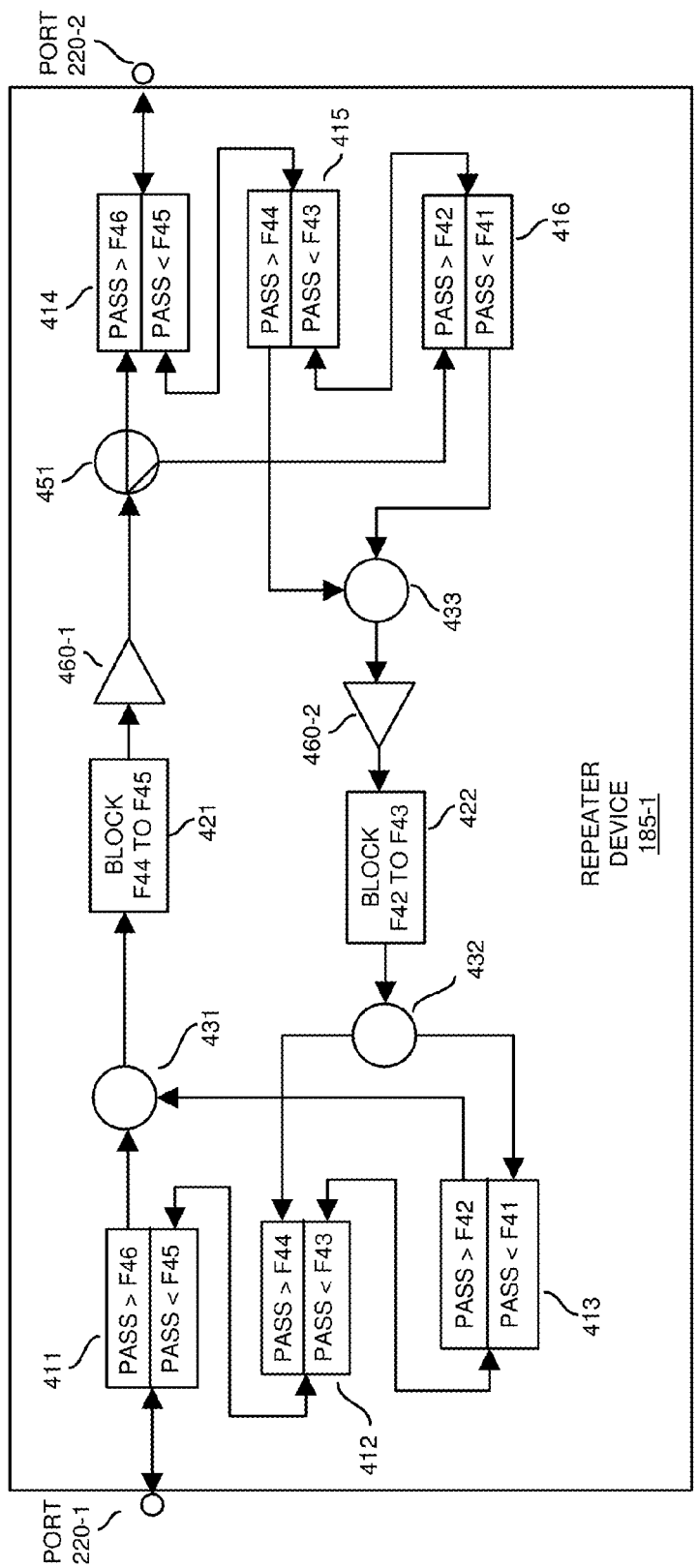
FIG. 4 is a diagram illustrating an example configuration of a repeater device according to embodiments herein.

FIG. 4 is an example diagram illustrating an example repeater device according to embodiments herein.

Repeater device 185-1 in FIG. 4 includes diplex filter 411, diplex filter 412, diplex filter 413, diplex filter 414, diplex filter 415, diplex filter 416, combiner 431, splitter 432, splitter 451, combiner 433, stop-band filter 421, stop-band filter 422, amplifier circuit 460-1, and amplifier circuit 460-2.

In general, the circuitry in repeater device 185-1 amplifies and retransmits signals in a band between frequency F42 and frequency F43 as well as signals in a band above frequency F46 in a downstream direction. The circuitry in repeater device 185-1 amplifies and retransmits signals in a band between frequency F40 (e.g., 5 MHz) and frequency 41 as well as signals in a band between frequency F44 and frequency F45 in an upstream direction.

In accordance with the configuration of circuitry in repeater device 185-1, as shown in FIG. 4, the diplex filter 411 passes signal frequencies received from port 220-1 that are greater than frequency F46 to input of combiner 431; diplex filter 411 passes signal frequencies received from diplex filter 412 that are less than frequency F45 to port 220-1; and diplex filter 411 passes signal frequencies received from port 220-1 that are less than frequency F45 to diplex filter 412.

Diplex filter 412 passes signal frequencies received from diplex filter 411 that are less than frequency F43 to diplex filter 413; diplex filter 412 passes signal frequencies received from diplex filter 413 that are less than frequency F43 to the diplex filter 411; and diplex filter 412 passes signal frequencies received from splitter 432 that are greater than frequency F44 to diplex filter 411.

Diplex filter 413 passes signal frequencies received from diplex filter 412 that are greater than frequency F42 to input of combiner 431; diplex filter 413 passes signal frequencies received from splitter 432 that are less than frequency F41 to the diplex filter 412.

As its name suggests, combiner 431 combines signal frequencies received from diplex filter 411 and the diplex filter 413. The combiner outputs the combined signal frequencies to stop-band filter 421. Stop-band filter 421 blocks frequencies between F44 and F45 but passes received signal frequencies outside of this band received from combiner 431 to amplifier circuit 460-1.

Amplifier circuit 460-1 outputs the amplified signal to splitter 451. Splitter 451 outputs the amplified signal received from amplifier circuit 460-1 to both diplex filter 414 and diplex filter 416.

Diplex filter 414 passes signal frequencies received from port 220-2 that are less than frequency F45 to diplex filter 415; diplex filter 414 passes signal frequencies received from diplex filter 415 that are less than frequency F45 to port 220-2; diplex filter 414 passes signal frequencies received from splitter 451 that are greater than frequency F46 to the port 220-2.

Diplex filter 415 passes signal frequencies received from diplex filter 414 that are less than frequency F43 to diplex filter 416; diplex filter 415 passes signal frequencies received from diplex filter 416 that are less than frequency F43 to diplex filter 414; diplex filter 415 passes signal frequencies received from diplex filter 414 that are greater than frequency F44 to combiner 433.

Diplex filter 416 passes signal frequencies received from splitter 451 that are greater than frequency F42 to diplex filter 415; diplex filter 416 passes signal frequencies received from diplex filter 415 that are less than frequency F41 to combiner 433.

Combiner 433 combines signal frequencies received from diplex filter 415 and the diplex filter 416. The combiner 433 outputs the combined signal frequencies to amplifier circuit 460-2. Amplifier circuit 460-2 outputs the amplified signal to stop-band filter 422. Stop-band filter 422 blocks frequencies between F42 and F43 but passes received signal frequencies outside of this band received from the amplified signal to splitter 432.

Splitter 432 outputs the filtered amplified signal received from amplifier circuit 460-2 to both diplex filter 412 and diplex filter 413.

Figure 5:
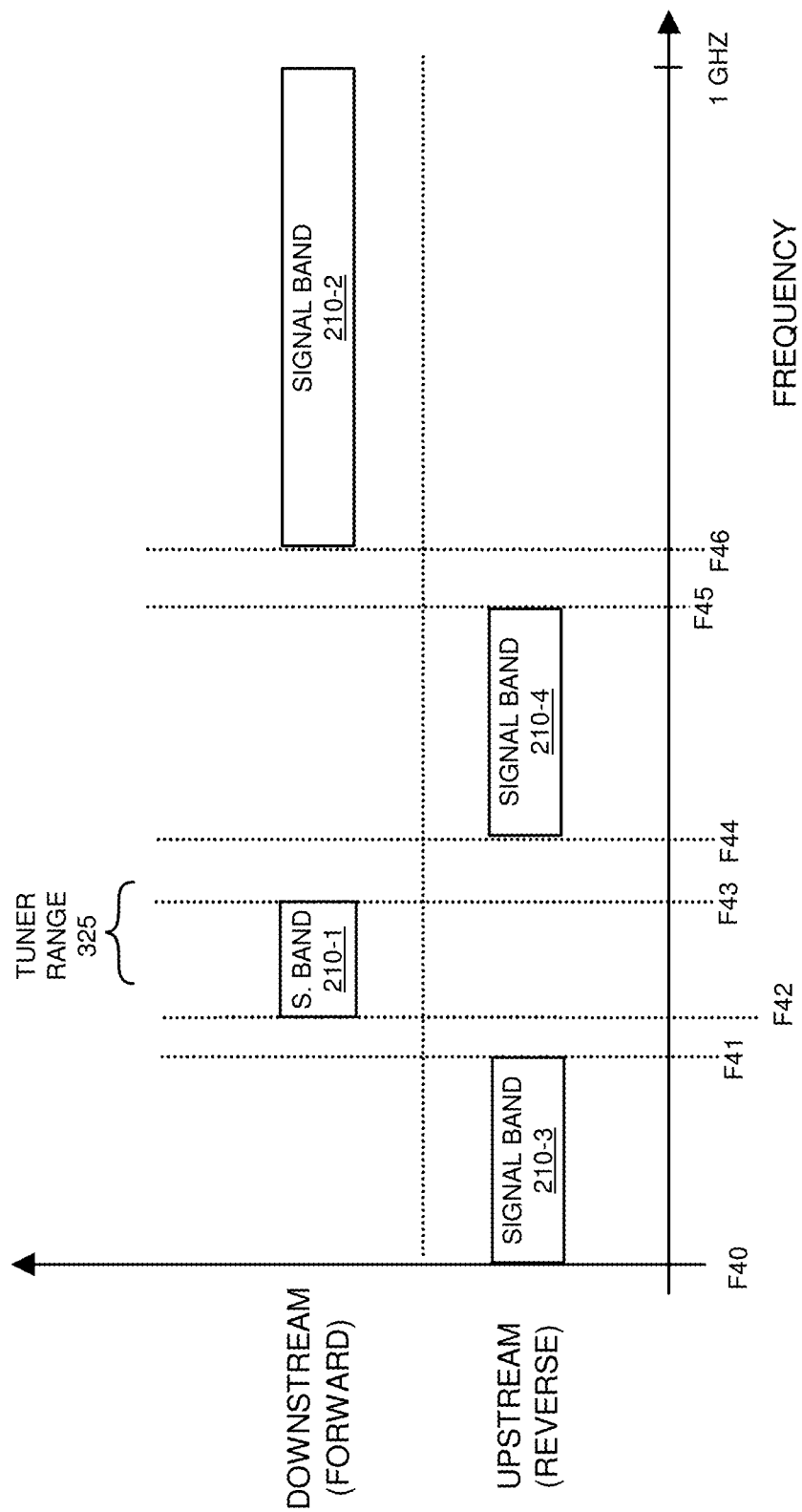
FIG. 5 is an example graph illustrating transmission of signal bands in upstream and downstream directions according to embodiments herein.

In accordance with the configuration of circuitry in the repeater device 185-1, and as shown in FIG. 5, the repeater device 185-1 supports amplification of signal bands 210-1 and signal band 210-2 in the upstream direction and amplification of signal bands 210-3 and signal band 210-4 in the downstream direction.

Frequencies F40, F41, F42, F43, F44, F45, and F46 can be set to any suitable value. By way of a non-limiting example, in one embodiment, the frequency F40 is set to approximately 5 MHz; the frequency F41 is set to approximately 40 MHz; frequency F42 is set to 54 MHz; frequency F43 is set to 120 MHz; frequency F44 is set to 145 MHz; frequency F45 is set to 265 MHz; and frequency F46 is set to 320 MHz.

Figure 6:
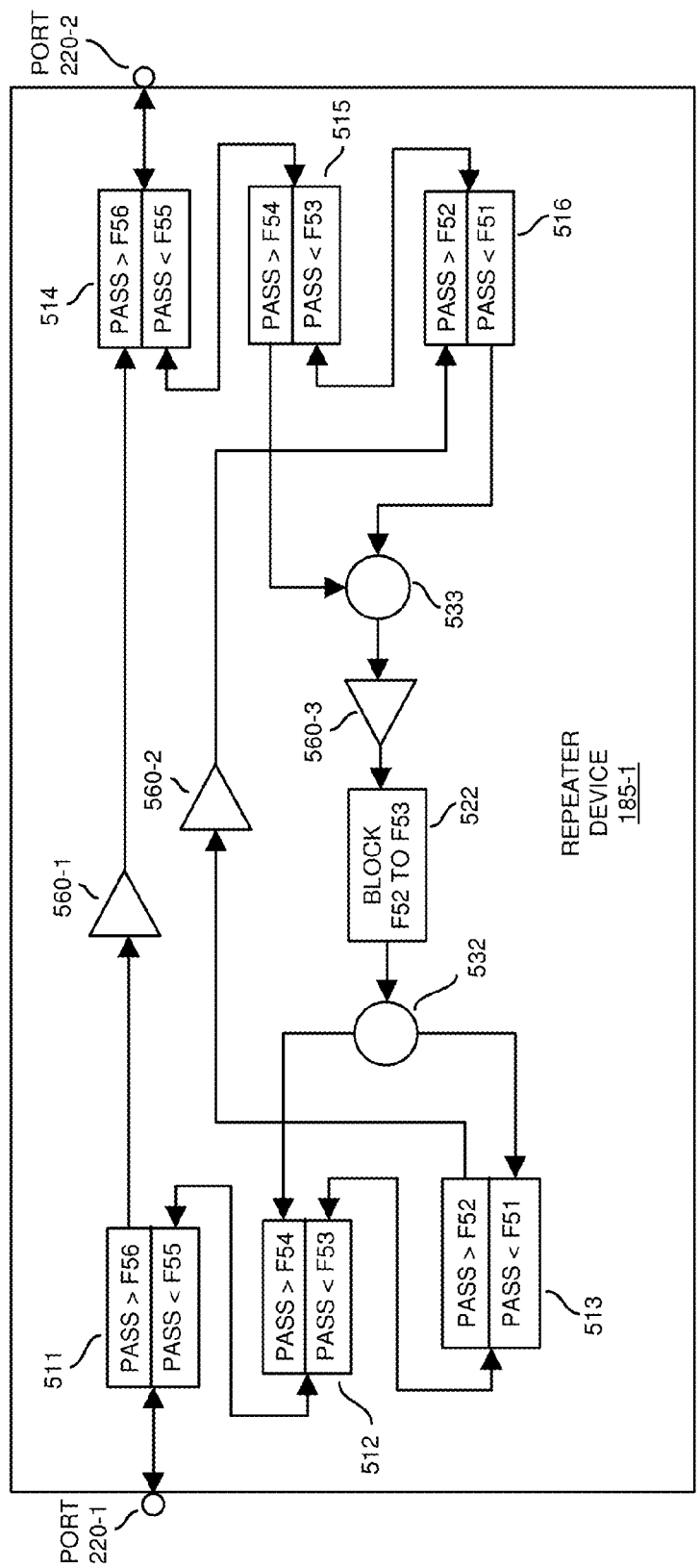
FIG. 6 is a diagram illustrating an example configuration of a repeater device according to embodiments herein.

FIG. 6 is an example diagram illustrating an example repeater device according to embodiments herein.

Repeater device 185-1 in FIG. 6 includes diplex filter 511, diplex filter 512, diplex filter 513, diplex filter 514, diplex filter 515, diplex filter 516, combiner 533, splitter 532, stop-band filter 522, amplifier circuit 560-1, amplifier circuit 560-2, and amplifier circuit 560-3.

Figure 7:
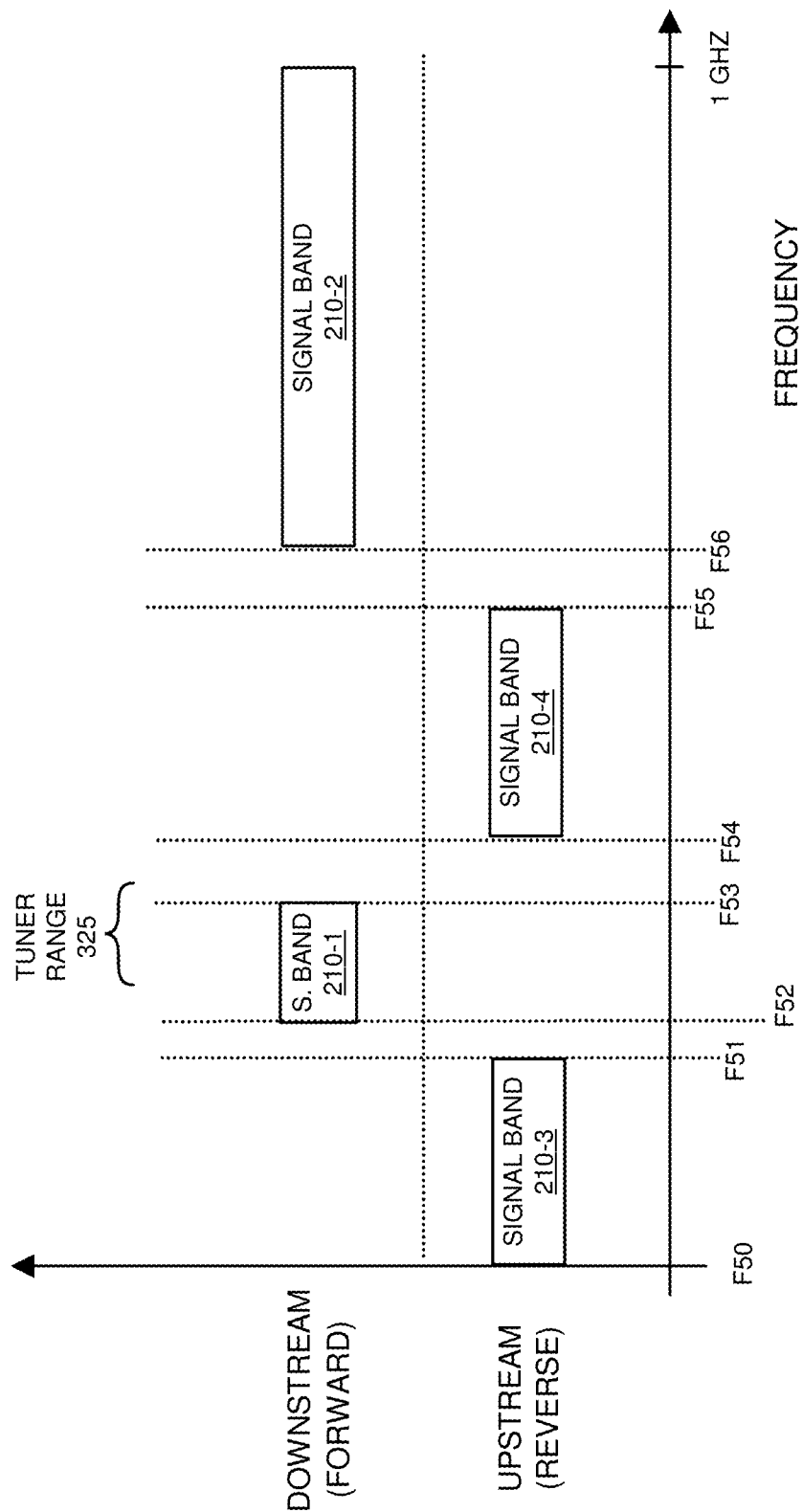
FIG. 7 is an example graph illustrating transmission of signal bands in upstream and downstream directions according to embodiments herein.

Each of the resources in the repeater device of FIG. 6 supports similar functionality as discussed above as the resources as discussed above in FIG. 4. Thus, in accordance with the configuration of circuitry in the repeater device 185-1 of FIG. 6, the repeater device 185-1 supports amplification and retransmission of signal bands 210-1 and signal band 210-2 in the downstream direction and amplification and retransmission of signal bands 210-3 and signal band 210-4 in the upstream direction as shown in FIG. 7.

Frequencies F50, F51, F52, F53, F54, F55, and F56 can be set to any suitable value. By way of a non-limiting example, in one embodiment, the frequency F50 is set to approximately 5 MHz, the frequency F51 is set to approximately 40 MHz; frequency F52 is set to 54 MHz; frequency F53 is set to 120 MHz; frequency F54 is set to 145 MHz, frequency F55 is set to 265 MHz; and frequency F56 is set to 320 MHz.

Figure 8:
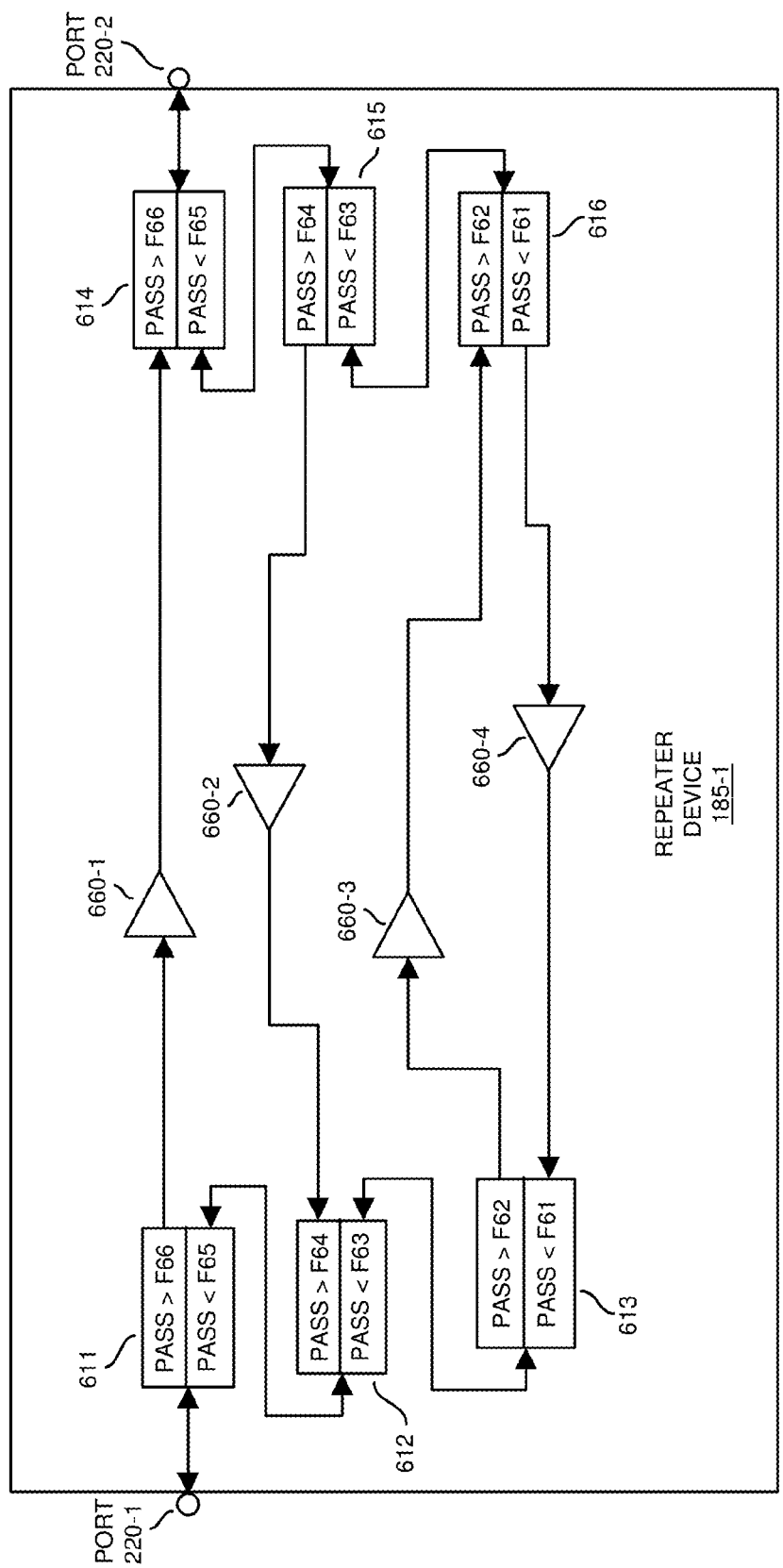
FIG. 8 is a diagram illustrating an example configuration of a repeater device according to embodiments herein.

FIG. 8 is an example diagram illustrating an example repeater device according to embodiments herein.

Repeater device 185-1 in FIG. 8 includes diplex filter 611, diplex filter 612, diplex filter 613, diplex filter 614, diplex filter 615, diplex filter 616, amplifier circuit 660-1, amplifier circuit 660-2, amplifier circuit 660-3, and amplifier circuit 660-4.

Figure 9:
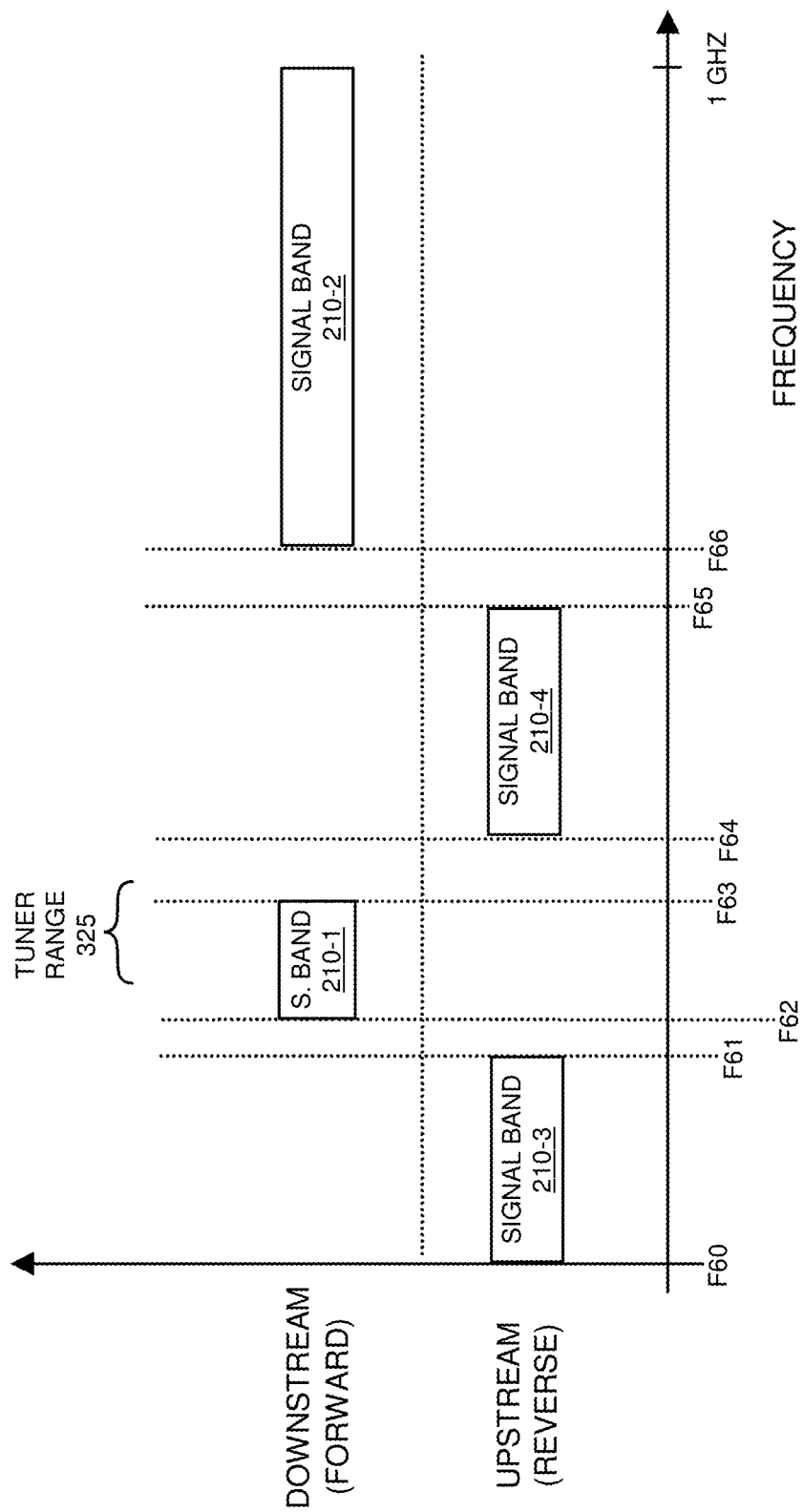
FIG. 9 is an example graph illustrating transmission of signal bands in upstream and downstream directions according to embodiments herein.

Each of the resources in the repeater device of FIG. 8 supports similar functionality for the corresponding resources as discussed above in FIG. 4. Thus, in accordance with the configuration of circuitry in the repeater device 185-1 of FIG. 8, the repeater device 185-1 supports amplification of signal bands 210-1 and signal band 210-2 in the downstream direction and amplification of signal bands 210-3 and signal band 210-4 in the upstream direction as shown in FIG. 9.

Figure 10:
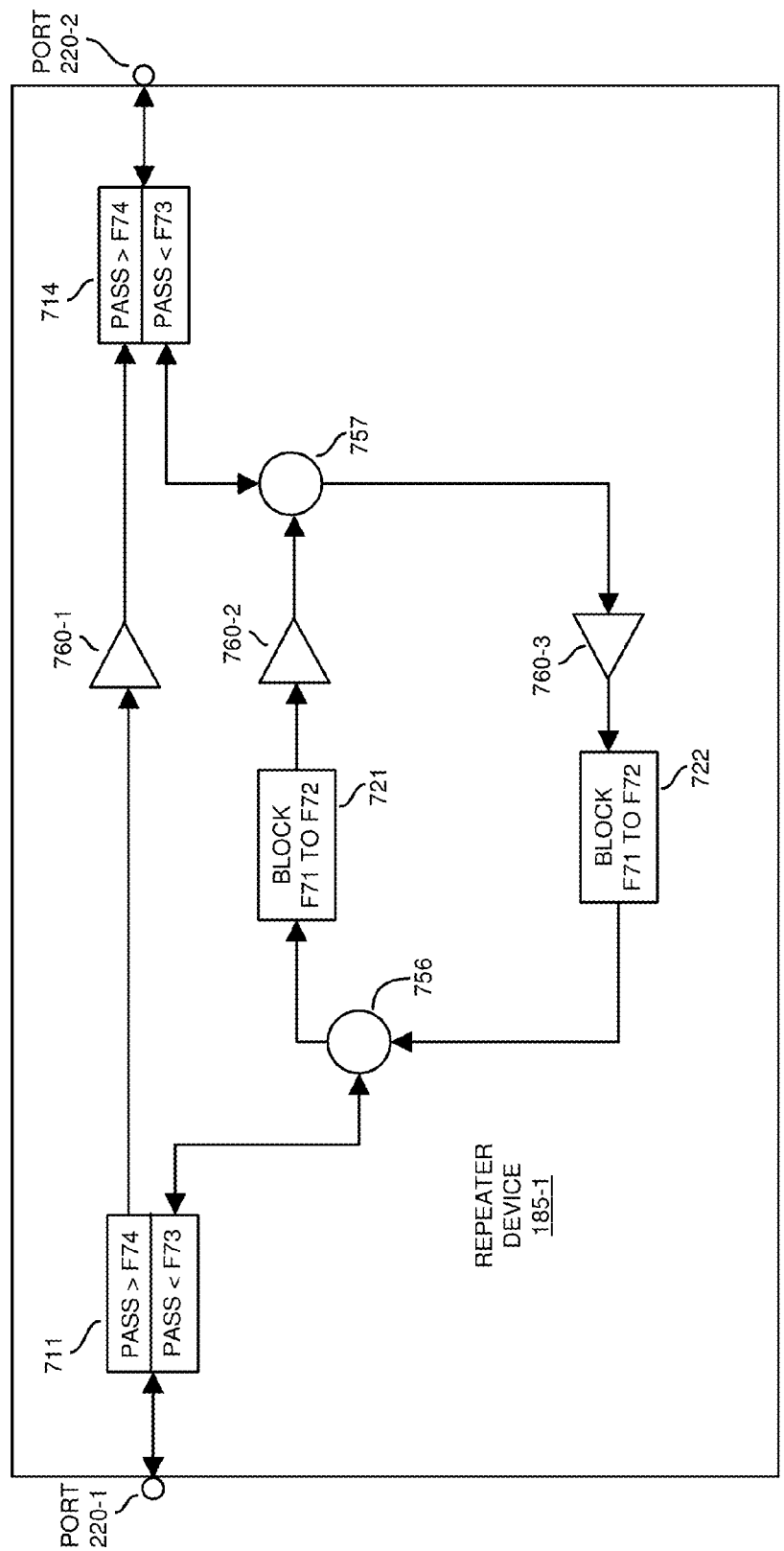
FIG. 10 is a diagram illustrating an example configuration of a repeater device according to embodiments herein.

Frequencies F60, F61, F62, F63, F64, F65, and F66 can be set to any suitable value. By way of a non-limiting example, the frequency F60 is set to approximately 5 MHz; the frequency F61 is set to approximately 40 MHz; frequency F62 is set to 54 MHz; frequency F63 is set to 120 MHz; frequency F64 is set to 145 MHz; frequency F65 is set to 265 MHz; and frequency F66 is set to 320 MHz. FIG. 10 is an example diagram illustrating an example repeater device according to embodiments herein.

Repeater device 185-1 in FIG. 10 includes diplex filter 711, diplex filter 714, combiner 756, combiner 757, amplifier circuit 760-1, amplifier circuit 760-2, and amplifier circuit 760-3.

Figure 11:
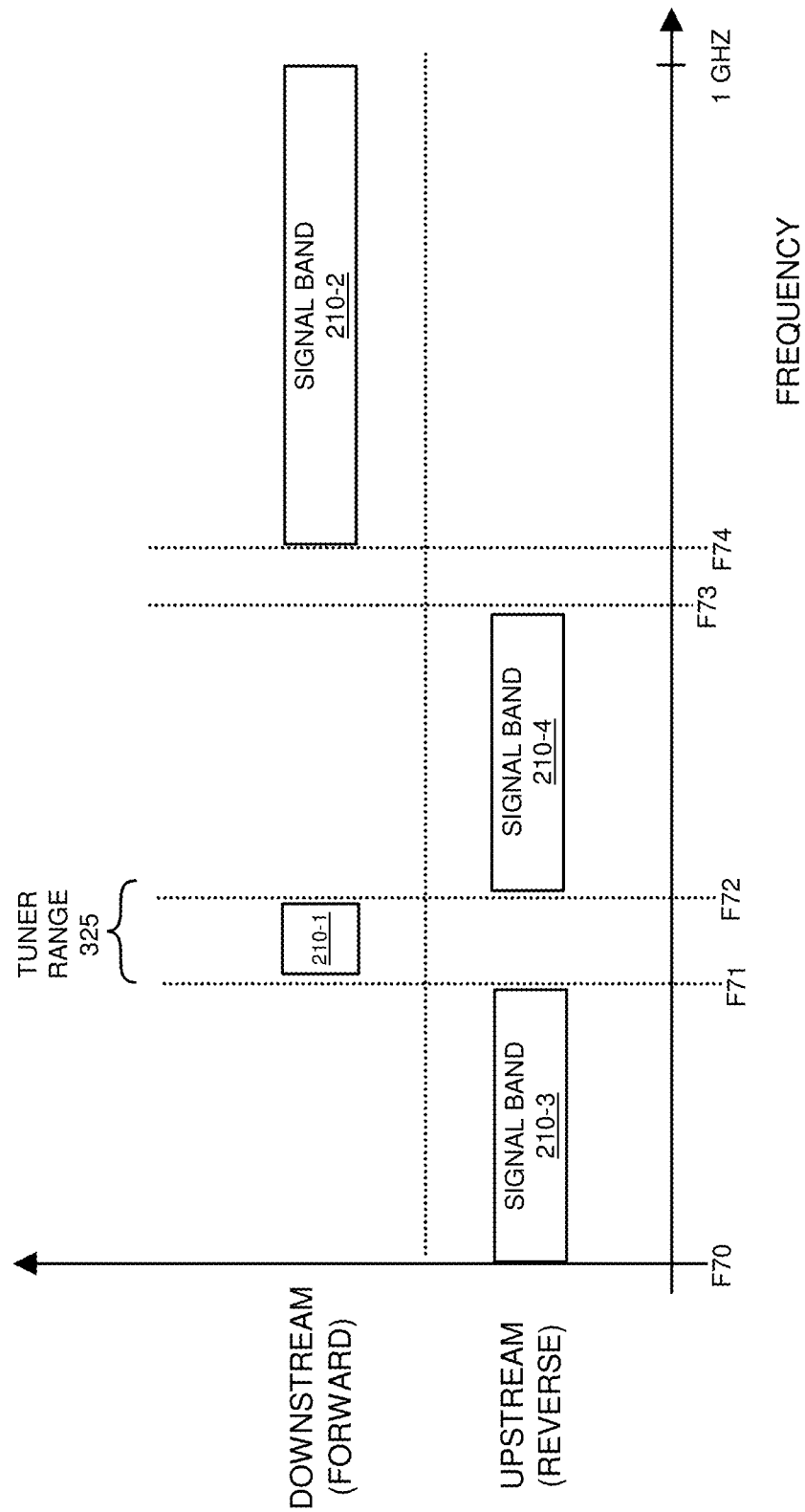
FIG. 11 is an example graph illustrating transmission of signal bands in upstream and downstream directions according to embodiments herein.

Each of the resources in the repeater device of FIG. 10 supports similar functionality for the corresponding resources as discussed above. Thus, in accordance with the configuration of circuitry in the repeater device 185-1 of FIG. 10, the repeater device 185-1 supports amplification of signal bands 210-1 and signal band 210-2 in the downstream direction and amplification of signal bands 210-3 and signal band 210-4 in the upstream direction as shown in FIG. 11. Frequencies F70, F71, F72, F73, and F74 can be set to any suitable value. By way of a non-limiting example, the frequency F70 is set to approximately 5 MHz; the frequency F71 is set to approximately 54 MHz; frequency F72 is set to 76 MHz; frequency F73 is set to 300 MHz; and frequency F74 is set to 360 MHz.

Thus, embodiments herein include an RF repeater amplifier device (and/or optical receiver/transmitter "node") capable of providing gain in four discrete frequency bands. The separation between these bands may be achieved either via cascaded pairs of traditional diplex filters, a combination of passive splitting and combining devices with high pass and low pass filters, a combination of passive splitting and combining devices with band pass and band stop filters, or various combinations of these options.

Embodiments herein are useful in a number of different environments such as HFC (Hybrid Fiber-Coaxial) broadband cable television networks that carry a variety of signal payloads for voice, video, data services, etc. Embodiments herein may be particularly useful in networks where large numbers of set-top boxes are present for reasons as discussed above.

In one embodiment, the ideal place for upstream transmitted signals in today's HFC networks is at the bottom of the available spectrum, due to the lower cable and passive losses in this region compared to other options such as middle or top frequencies. These lower losses accommodate higher modulation densities (a.k.a., "bit loadings") for any given combination of transmitter output, occupied spectrum bandwidth, and receiver sensitivity.

The requirement for continued carriage of the legacy set-top box forward data carrier (FDC) has been a barrier to the adoption of such a bottom split architecture, since nearly all presently deployed set-top boxes are limited in the tuning of this carrier frequency up to only about 130 MHz. This FDC tuning limit barrier largely determined the passband capabilities of presently available mid-split spectrum HFC equipment designs in the range of 5 to 85 MHz, which is insufficient for carriage of a 1 Gbit/s upstream data service.

Embodiments herein allow the upstream spectrum or signal band to continue to be located at the bottom of the present passband of in-place equipment, while at the same time providing a forward connection for the legacy set-top box FDC within its required receiver tuning range.

As previously discussed, embodiments herein are unique over conventional methods. For example, conventional networks utilize two or three passbands in the spectrum below 1 GHz where existing HFC cable networks currently operate. In contrast, embodiments herein propose use of at least four or more separate passbands in this HFC spectrum region (e.g., at least two in each upstream and downstream direction). Embodiments herein enable reuse of existing equipment such as cable, connectors, taps, splitters, couplers, etc. Embodiments herein conserve bandwidth and utilize spectrum that allows implementation of efficient and cost effective upstream modem transmitters capable of achieving up to or more than 1 GBit/second transmission rates.

Figure 12:
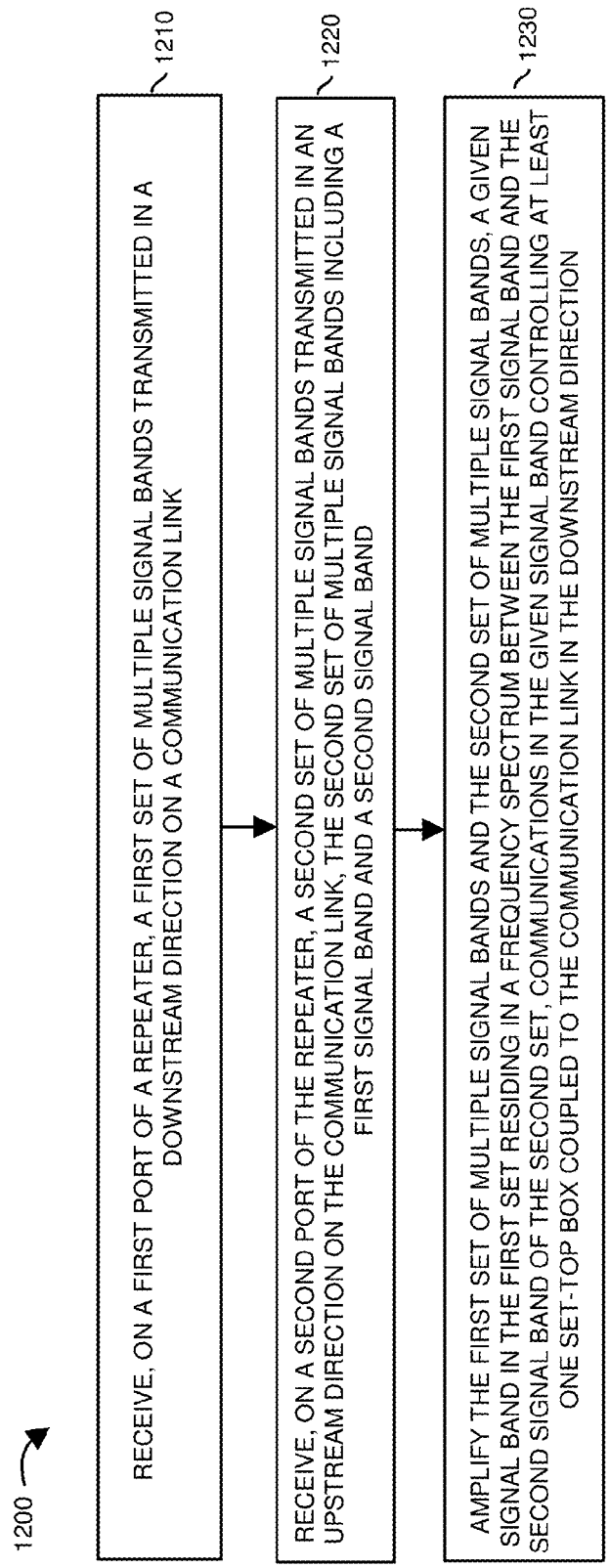
FIG. 12 is a diagram illustrating an example method according to embodiments herein.

FIG. 12 is a flowchart 1200 illustrating an example method according to embodiments herein. Note that there will be some overlap with respect to concepts as discussed above.

In step 1210, the repeater device 185-1 receives, on a first port 220-1, a first set of multiple signal bands 210 (e.g., signal band 210-1 and signal band 210-2) transmitted in a downstream direction on a communication link 215.

In step 1220, the repeater device 185-1 receives, on a second port, a second set of multiple signal bands 210 (e.g., signal band 210-3 and signal band 210-4) transmitted in an upstream direction on the communication link 215.

In step 1230, the repeater device 185-1 amplifies the first set of multiple signal bands 210-1 and band 210-2 and the second set of multiple signal bands 210-3 and 210-4. As mentioned, the signal band 210-1 in the first set can reside in a frequency spectrum between the third signal band 210-3 and the fourth signal band 210-4 of the second set. Communications in the first signal band 210-1 control at least one communication device 240 such as a set-top box coupled to the communication link 215 in the downstream direction.

Note again that techniques herein are well suited for allocation and use of a frequency spectrum in a cable network environment. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A system comprising:
   a first port, the first port receiving a first set of multiple signal bands transmitted in a downstream direction on a communication link;
   a second port, the second port receiving a second set of multiple signal bands transmitted in an upstream direction on the communication link, the second set of multiple signal bands including a first signal band and a second signal band; and
   amplifier circuitry to amplify the first set of multiple signal bands and the second set of multiple signal bands, a given signal band in the first set residing in a frequency spectrum between the first signal band and the second signal band of the second set, the given signal band controlling at least one device coupled to the communication link in the downstream direction;
   the amplifier circuitry including a first portion and a second portion, the first portion of the amplifier circuitry amplifying the first set of multiple signal bands and outputting the amplified first set of multiple signal bands through the second port in the downstream direction on the communication link, the second portion of the amplifier circuitry amplifying the second set of multiple signal bands and outputting the amplified second set of multiple signal bands through the first port in the upstream direction on the communication link;
   wherein the first portion of the amplifier circuitry resides in a first communication path between the first port and the second port, the first portion of the amplifier circuitry amplifying the given signal band and outputting the amplified given signal band out the second port;
   wherein the second portion of the amplifier circuitry resides in a second communication path between the second port and the first port, the second portion of the amplifier circuitry amplifying the second set of signal bands and outputting the amplified second set of signal bands out the second port; and
   the system further comprising: a first block filter and a second block filter, the first block filter disposed in the first communication path to block a first frequency range of signals in which the first signal band of the second set resides, the second block filter disposed in the second communication path to block a second frequency range of signals in which the given signal band resides;
   the system further comprising:

a first multi-port filter resource including port A1, port B1, and port C1;

wherein port A1 is communicatively coupled to the first port, the first communication path extending from the first port through port A1 and port B1 of the multi-port filter resource to the first portion of the amplifier circuitry, the second communication path extending from the second portion of the amplifier circuitry through port C1 and port A1 to the first port.

2. The system as in claim 1, wherein the at least one device includes tuner circuitry on which to receive control data transmitted in the downstream direction over an allocated carrier frequency range; and wherein a portion of the given signal band resides in the allocated carrier frequency range and a portion of the second signal band resides within the allocated carrier frequency range.

3. The system as in claim 1, wherein the at least one device is a set-top box operated by a subscriber, the set-top box playing back content on a respective playback device depending on control signals received in the given signal band.

4. The system as in claim 1, wherein the communication link is a coaxial cable conveying data in both the upstream direction and the downstream direction.

5. The system as in claim 4, wherein the given signal band includes communications transmitted in a carrier frequency range between 82 and 88 Megahertz.

6. The system as in claim 1 further comprising:

a first crossover band, the first crossover band residing in the frequency spectrum between the given signal band and the first signal band of the second set; and a second crossover band, the second crossover band residing in the frequency spectrum between the given signal band and the second signal band of the second set.

7. The system as in claim 1, wherein the first signal band resides lower in the frequency spectrum than the given signal band;

wherein the given signal band resides lower in the frequency spectrum than the second signal band; and wherein the first set of multiple signal bands includes the given signal band and another signal band, the second signal band resides lower in the frequency spectrum than the other signal band in the first set.

8. The system as in claim 7, wherein the first signal band includes at least one communication transmitted in a carrier frequency range between 40 and 65 Megahertz in the upstream direction;

wherein the given signal band includes at least one communication transmitted in a carrier frequency range between 72 and 130 Megahertz in the downstream direction;

wherein the second signal band includes at least one communication transmitted in a carrier frequency range between 108 and 270 Megahertz in the upstream direction; and wherein the other signal band includes at least one communication transmitted in a carrier frequency range between 330 and 1002 Megahertz in the downstream direction.

9. The system as in claim 8, wherein a combination of the first signal band and the second signal band include more than 150 Megahertz of available bandwidth to transmit data in the upstream direction; and wherein a combination of the given signal band and the other signal band include more than 500 Megahertz of available bandwidth to transmit data in the downstream direction.

10. The system as in claim 1, wherein a combination of the first signal band and the second signal band include more than 150 Megahertz of available bandwidth to transmit data in the upstream direction; and wherein a combination of the given signal band and the other signal band include more than 500 Megahertz of available bandwidth to transmit data in the downstream direction.

11. The system as in claim 1, wherein the at least one device includes tuner circuitry, the tuner circuitry tunable within a tuner frequency range;

wherein the amplified given signal band resides in the tuner frequency range; and wherein at least a portion of the second set of multiple signal bands transmitted in the upstream direction on the communication link resides within the tuner frequency range.

12. The system as in claim 11 further comprising:

a first crossover band, the first crossover band residing in the frequency spectrum between the given signal and the first signal band of the second set; and a second crossover band, the second crossover band residing in the frequency spectrum between the given signal and the second signal band of the second set; and wherein the first crossover band resides within the tuner range.

13. The system as in claim 12, wherein the second crossover band resides outside of the tuner range.

14. The system as in claim 1, wherein the first set of signal bands includes the given signal band and a supplemental signal band, the system further comprising: a first bi-directional filter resource and a second bi-directional filter resource; the first bi-directional filter resource receiving the supplemental signal band and outputting the supplemental signal band downstream on the first communication path as an input to the first portion of the amplifier circuitry; the first bi-directional filter resource further receiving the given signal band and outputting the given signal band downstream on the first communication path to the second bi-directional filter resource; and the second bi-directional filter resource receiving the given signal band and outputting the given signal band to the input of the first portion of the amplifier circuitry.

15. The system as in claim 14, wherein the first bi-directional filter resource receives the amplified second set of signal bands produced by the second portion of the amplifier circuitry and transmits the amplified second set of signal bands to and through the first port.

16. A method comprising:

receiving, on a first port of a repeater, a first set of multiple signal bands transmitted in a downstream direction on a communication link;

receiving, on a second port of the repeater, a second set of multiple signal bands transmitted in an upstream direction on the communication link, the second set of multiple signal bands including a first signal band and a second signal band;

amplifying the first set of multiple signal bands via a first portion of amplifier circuitry residing in a first communication path between the first port and the second port, amplifying the second set of multiple signal bands via a second portion of amplifier circuitry residing in a second communication path between the second port and the first port, a given signal band in the first set residing in a frequency spectrum between the first signal band and the second signal band of the second set, communications in the given signal band providing data to at least one device coupled to the communication link in the downstream direction;

implementing a first block filter and a second block filter, the first block filter disposed in the first communication path to block a first frequency range of signals in which the first signal band of the second set resides, the second block filter disposed in the second communication path to block a second frequency range of signals in which the given signal band resides;

implementing a first multi-port filter resource including port A1, port B1, and port C1, wherein port A1 is communicatively coupled to the first port, the first communication path extending from the first port through port A1 and port B1 of the multi-port filter resource to the first portion of the amplifier circuitry, the second communication path extending from the second portion of the amplifier circuitry through port C1 and port A1 to the first port;

outputting the amplified first set of multiple signal bands on the second port in the downstream direction on the communication link; and outputting the amplified second set of multiple signal bands on the first port in the upstream direction on the communication link.

17. The method as in claim 16, wherein the at least one device includes tuner circuitry on which to receive control data in the downstream direction over an allocated carrier frequency range; and wherein a portion of the given signal band resides in the allocated carrier frequency range and a portion of the second signal band reside within the allocated carrier frequency range.

18. The method as in claim 16, wherein the at least one device is a set-top box operated by a subscriber, the method further comprising:

playing back content on a respective playback device in communication with the set-top box depending on control signals received in the given signal band.

19. The method as in claim 16 further comprising:

transmitting communications in the given signal band in a carrier frequency range between 82 and 88 Megahertz.

20. The method as in claim 16, wherein the first signal band resides lower in the frequency spectrum than the given signal band;

wherein the given signal band resides lower in the frequency spectrum than the second signal band; and wherein the first set of multiple signal bands includes the given signal band and another signal band, the second signal band resides lower in the frequency spectrum than the other signal band in the first set.

21. The method as in claim 20, transmitting the first signal band to include at least one communication modulated on a carrier frequency range between 40 and 65 Megahertz in the upstream direction;

transmitting the given signal band to include at least one communication modulated on a carrier frequency range between 72 and 130 Megahertz in the downstream direction;

transmitting the second signal band to include at least one communication modulated on a carrier frequency range between 108 and 270 Megahertz in the upstream direction; and transmitting the other signal band to include at least one communication modulated on a carrier frequency range between 330 and 1002 Megahertz in the downstream direction.

22. The method as in claim 21 further comprising:

allocating the first signal band and the second signal band to include more than 150 Megahertz of available bandwidth to transmit data in the upstream direction; and allocating the given signal band and the other signal band to include more than 500 Megahertz of available bandwidth to transmit data in the downstream direction.

* * * * *